United States Patent Office 3,186,991
Patented June 1, 1965

3,186,991
5,6,7,8-TETRAHYDRO-PYRIDO-[4,3-d]-
PYRIMIDINES
Gerhard Ohnacker, Biberach (Riss), Germany, assignor,
by mesne assignments, to Boehringer Ingelheim
G.m.b.H., Ingelheim (Rhine), Germany, a corporation
of Germany
No Drawing. Filed Mar. 14, 1963, Ser. No. 265,084
Claims priority, application Germany, Mar. 22, 1962,
T 21,811
14 Claims. (Cl. 260—256.4)

This invention relates to novel 5,6,7-8-tetrahydro-pyrido-[4,3-d]-pyrimidines and their non-toxic acid addition salts, as well as to a method of preparing these compounds.

More particularly, the present invention relates to 5,6,7,8 - tetrahydro - pyrido - [4,3 - d] - pyrimidine substitution products of the formula

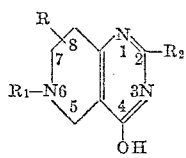

wherein

R is hyrogen, alkyl, aryl or aralkyl, $R_1$ is hydrogen, amino-alkyl, alkoxy-alkyl, aryl or aralkyl and $R_2$ is hydrogen, hydroxyl, alkyl, aryl, aralkyl, amino, mono-substituted amino, di-substituted amino, saturated basis heterocyclic amino, such as pyrrolidino, piperidino, piperazino or morpholino, mercapto, alkyl-mercapto or aralkyl-mercapto, and their non-toxic, pharmacologically acceptable acid addition salts.

The compounds of the present invention may be prepared by reacting a piperidone-carboxylic acid lower alkyl ester of the formula

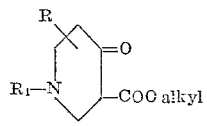

wherein R and $R_1$ have the same meanings as in Formula I, or an acid addition salt thereof with an amidine of the formula

wherein $R_2$ has the same meanings as in Formula I, or with an inorganic or organic acid addition salt of said amidine.

The reaction of the piperidone-carboxylic acid ester II and the amidine III or an acid addition salt thereof is preferably carried out in the prseence of an alkaline condensation agent and of an inert solvent at room temperature or at moderately elevated temperatures. Examples of suitable alkaline condensation agents are alkali metal hydroxides, alkali metal carbonates or alkali metal alcoholates. The solvent medium may be water or an organic solvent, such as methanol, ethanol, benzene, tetrahydrofuran, and the like.

In those instances where the above reaction yields compounds of the Formula I wherein $R_2$ is mercapto or substituted mercapto, the thio substituent in the 2-position may subsequently, if desired, be converted into any of the basic substituents listed in the definition of $R_2$ above, namely, by reaction of the 2-thio compound with ammonia, a primary or a secondary amine. This reaction is preferably performed with an excess of the particular amine and, if necessary, in the presence of an inert organic solvent, such as ethanol, benzene, tetrahydrofuran and the like. The particular amine in still larger excess may also serve as the solvent medium. The conversion reaction is performed at a temperature between 20 and 180° C. preferably at the boiling point of the solvent medium or the particular amine reactant; in the event that an amine or a solvent with a relatively low boiling point is used, it is recommended to perform the reaction in a closed vessel.

Thus, compounds of the Formula I above wherein $R_2$ represents a basic substituent, may be prepared either by a one-step or a two-step process.

After isolation from the reaction mixture, the free bases obtained by the above-described processes may, if desired, be converted into their acid addition salts. This is most conveniently accomplished by dissolving the free base in a suitable solvent and then acidifying the solution with the desired acid, preferably a pharmacologically acceptable acid, as defined below. If the free base contains more than one basic nitrogen atom, acid addition salts with more than one equivalent of the particular acid may be obtained.

The majority of the piperidone-carboxylic acid lower alkyl esters of the Formula II above, which are used as starting materials for the preparation of the novel 5,6,7,8-tetrahydro-pyrido-[4,3-d]-pyrimidine substitution products of the present invention, are well-known compounds. Those which may not be specifically described in the literature, however, may readily be prepared from imino-dipropionic acid lower alkyl esters of the formula

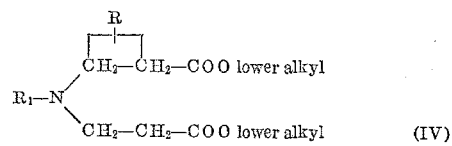

wherein R and $R_1$ have the meanings previously defined, by means of the Dieckmann reaction [Berichte 27, 102, 965 (1894)] in the presence of sodium amide or metallic sodium.

In this manner the following piperidone-carboxylic acid lower alkyl esters of the Formula II were prepared:

(1)

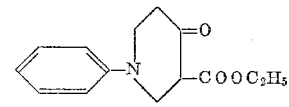

M.P. of its hydrochloride: 146° C.

(2)

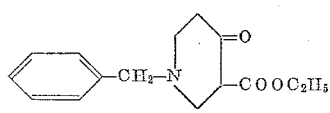

M.P. of its hydrochloride: 182° C.

(3)

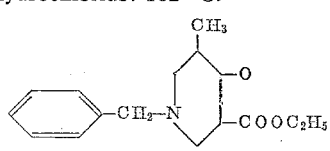

M.P. of its hydrochloride: 194° C.

(4)

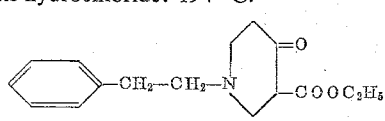

M.P. of its hydrochloride: 166° C.

(5)

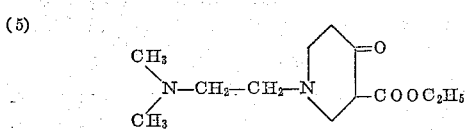

M.P. of its hydrochloride: 200° C.

(6)

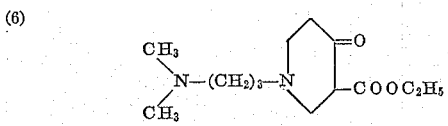

M.P. of its hydrochloride: 186° C.

(7)

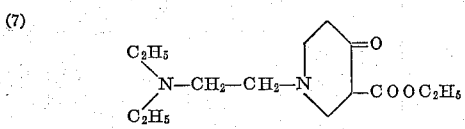

M.P. of its hydrochloride: 174° C.

(8)

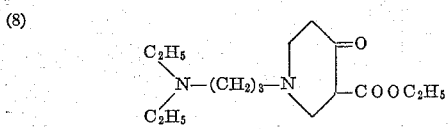

M.P. of its hydrochloride: 154° C.

A particularly advantageous embodiment of the method of preparing the compounds of the present invention consists of starting with an imino-dipropionic acid lower alkyl ester of the Formula IV, subjecting this compound to the Dieckmann condensation reaction and, without isolating the intermediate product II, reacting the reaction mixture of the Dieckmann reaction with an amidine of the Formula II, preferably in the presence of water or an inert organic solvent.

The following examples will further illustrate the present invention and will enable others skilled in the art to understand the invention more completely. It should be understood, however, that the invention is not limited to these particular examples.

EXAMPLE 1

*Preparation of 2-methyl-4-hydroxy-6-benzyl-5,6,7,8-tetrahydro-pyrido-[4,3-d]-pyrimidine*

29.7 gm. of N-benzylpiperidone-(4)-3-carboxylic acid ethyl ester hydrochloride, 9.5 gm. of acetamidine hydrochloride and 27.6 gm. of potassium carbonate were each dissolved in 50 cc. portions of water. The individual aqueous solutions were combined, and the resulting mixture was stirred at 50° C. for five hours. Thereafter, the mixture was stirred for fifteen hours more at room temperature. After standing for a while, the reaction mixture separated into two phases; the upper phase was decanted and the greasy residue was stirred with a small amount of ether. The crystalline mass formed thereby was recrystallized from ethanol, yielding 9.6 gm. of the compound of the formula

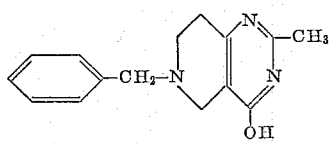

It had a melting point of 195–197° C.

EXAMPLE 2

*Preparation of 6-(γ-dimethylamino-n-propyl)-2-benzyl-4-hydroxy-5,6,7,8-tetrahydro-pyrido-[4,3-d]-pyrimidine*

32.9 gm. of N-(γ-dimethylamino-n-propyl)-piperidone-(4)-3-carboxylic acid ethyl ester dihydrochloride, 17.0 gm. of phenylacetamidine hydrochloride and 20.8 gm. of potassium carbonate were each dissolved in 40 cc. portions of water, the aqueous solutions were combined, and the mixture was heated at 80° C. for eight hours. The reaction solution was then concentrated by evaporation to about one-third its volume and was thereafter continuously extracted for eight hours with chloroform. The chloroform extract solution was filtered through charcoal, and the filtrate was concentrated by evaporation until an oily residue remained. The residue was stirred with a small amount of ether, whereby a crystalline precipitate formed. The crystalline mass was separated by vacuum filtration and was recrystallized from acetone. 11.6 gm. of the compound of the formula

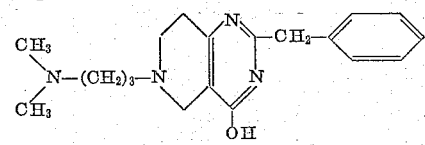

were obtained. It had a melting point of 135° C.

EXAMPLE 3

Using a procedure analogous to that described in Example 1, 8 gm. of 6-benzyl-2-phenyl-4-hydroxy-5,6,7,8-tetrahydro-pyrido-[4,3-d]-pyrimidine of the formula

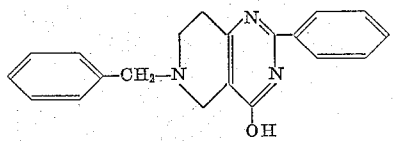

were prepared from 29.8 gm. of N-benzyl-piperidone-(4)-3-carboxylic acid ethyl ester hydrochloride, 15.7 gm. of benzamidine hydrochloride and 29 gm. of potassium carbonate. After recrystallization from a mixture of ethanol and chloroform the product had a melting point of 245° C.

EXAMPLE 4

*Preparation of 6-(β-dimethylamino-ethyl)-2-phenyl-4-hydroxy-5,6,7,8-tetrahydro-pyrido-[4,3-d]-pyrimidine*

Separate saturated aqueous solutions were prepared of 47.6 gm. of N-(β-dimethylamino-ethyl)-piperidone-(4)-3-carboxylic acid ethyl ester dihydrochloride, 23.5 gm. of benzamidine hydrochloride and 31.1 gm. of potassium carbonate. The three solutions were combined, and the mixture was stirred at 80° C. for 45 hours. The reaction mixture was allowed to cool, whereby a crystalline precipitate formed. The precipitate was separated by vacuum filtration, washed with water and dried. After recrystallization from a mixture of methyl ethyl ketone and ethanol, 27 gm. of the compound of the formula

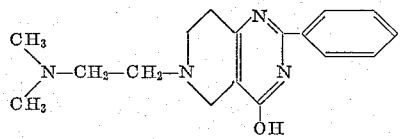

were obtained. The product had a melting point of 172–174° C.

EXAMPLE 5

Using a procedure analogous to that described in Example 4, 32 gm. of 6-(γ-diethylamino-n-propyl)-2-phenyl-4-hydroxy-5,6,7,8-tetrahydro-pyrido-[4,3-d]-pyrimidine of the formula

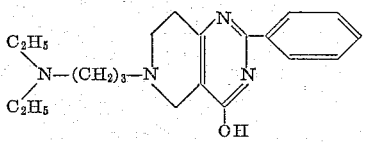

were prepared from 71.5 gm. of N-(γ-diethylamino-n-propyl)-piperidone-(4)-3-carboxylic acid ethyl ester dihydrochloride, 31.3 gm. of benzamidine hydrochloride and 41.5 gm. of potassium carbonate. The product had a melting point of 117° C. after recrystallization from acetone.

EXAMPLE 6

*Preparation of 6-benzyl-2-amino-4-hydroxy-5,6,7,8-tetrahydro-pyrido-[4,3-d]-pyrimidine*

A solution of 36.6 gm. of guanidine nitrate in 500 cc. of water and a solution of 82.9 gm. of potassium carbonate in 600 cc. of water were added to a suspension of 89.3 gm. of N-benzyl-piperidone-(4)-3-carboxylic acid ethyl ester hydrochloride in 500 cc. of water. A viscous, tacky mass precipitated out. The supernatant liquid was decanted and discarded. The tacky residue was stirred with a small amount of ethanol, whereupon it crystallized. The crystallizate was separated by vacuum filtration and recrystallized from dimethylformamide, yielding 32 gm. of the compound of the formula

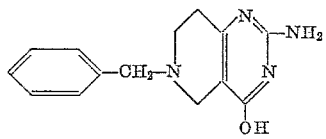

The product had a melting point of 269–270° C.

EXAMPLE 7

*Preparation of 6-benzyl-2-morpholino-4-hydroxy-5,6,7,8-tetrahydro-pyrido-[4,3-d]-pyrimidine*

A solution of 8.3 gm. of morpholino-guanidine hydrochloride in 25 cc. of water and a solution of 13.8 gm. of potassium carbonate in 25 cc. of water were added to a suspension of 14.9 gm. of N-benzyl-piperidone-(4)-3-carboxylic acid ethyl ester hydrochloride in 100 cc. of water. The mixture was stirred for 15 hours at room temperature. After standing a while, the supernatant liquid was decanted from the oil which separated out, the oily residue was stirred with a small amount of ether, and the crystalline mass formed thereby was vacuum filtered. The filter cake was recrystallized from methyl glycol, yielding 5 gm. of the compound of the formula

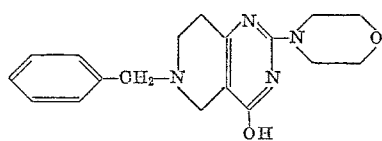

The product had a melting point of 240° C.

EXAMPLE 8

*Preparation of 6-phenyl-2-morpholino-4-hydroxy-5,6,7,8-tetrahydro-pyrido-[4,3-d]-pyrimidine*

26.4 gm. of 6-phenyl-2-ethylmercapto-4-hydroxy-5,6,7,8-tetrahydro-pyrido-[4,3-d]-pyrimidine (M.P. 243–244° C.), obtained by condensing N-phenyl-piperidone-(4)-3-carboxylic acid ethyl ester with S-ethyl-thiourea hydro-bromide and potassium carbonate, were refluxed with 35 gm. of morpholine for 20 hours while stirring. Thereafter, the unreacted excess morpholine was removed by vacuum distillation, and the residue was recrystallized from methyl glycol. 25 gm. of the compound of the formula

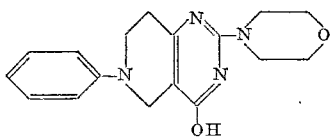

were obtained. The product had a melting point of 260–261° C.

EXAMPLE 9

*Preparation of 6-benzyl-2-methylmercapto-4-hydroxy-5,6,7,8-tetrahydro-pyrido-[4,3-d]-pyrimidine*

A solution of 147 gm. of S-methyl-isothiourea sulfate in 500 cc. of water and a solution of 292 gm. of potassium carbonate in 500 cc. of water were added to a suspension of 315 gm. of N-benzyl-piperidone-(4)-3-carboxylic acid ethyl ester hydrochloride in 500 cc. of water. An oil separated out, which crystallized after a short period of time. The reaction mixture was stirred for four hours, and then the crystalline precipitate was separated by vacuum filtration. The filter cake was washed with a small amount of ether and was then recrystallized from a large volume of ethanol. 260 gm. of the compound of the formula

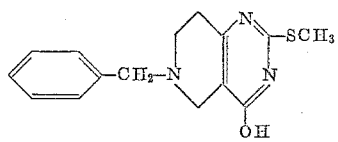

were obtained. The product had a melting point of 211–212° C.

EXAMPLE 10

Using a procedure analogous to that described in Example 9, 8 gm. of 6-benzyl-8-methyl-2-ethyl-mercapto-4-hydroxy-5,6,7,8-tetrahydro-pyrido-[4,3-d]-pyrimidine of the formula

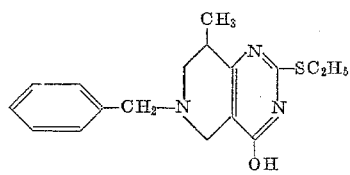

were prepared from 14.9 gm. of N-benzyl-5-methyl-piperidone-(4)-3-carboxylic acid ethyl ester hydrochloride, 8 gm. of S-ethyl-isothiourea hydrobromide and 20.7 gm. of potassium carbonate. The product had a melting point of 156–157° C.

EXAMPLE 11

*Preparation of 6-(β-phenyl-ethyl)-2-ethylmercapto-4-hydroxy-5,6,7,8-tetrahydro-pyrido-[4,3-d]-pyrimidine*

72 gm. of (β-phenyl-ethyl)-amino-dipropionic acid-diethyl ester were added to a solution of 5.2 gm. of sodium in 200 cc. of absolute methanol, the methanol was removed by vacuum distillation and the residue was heated at 120–130° C. for half an hour. The reaction mixture was taken up in 100 cc. of water, and a solution of 32.5 gm. of S-ethyl-isothiourea hydrobromide in 100 cc. of water was added. The resulting mixture was heated at 60° C. for four hours while stirring; the initially oily precipitate which formed turned crystalline. The crystalline precipitate was separated and was recrystallized from methanol, yielding 28 gm. of the compound of the formula

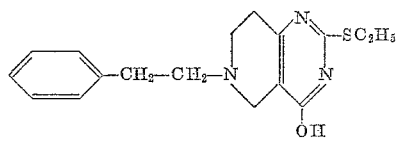

which had a melting point of 203–204° C.

EXAMPLE 12

*Preparation of 6-(β-dimethylamino-ethyl)-2-benzyl-mercapto-4-hydroxy-5,6,7,8-tetrahydro-pyrido-[4,3-d]-pyrimidine*

15.7 gm. of N-(β-dimethylamino-ethyl)-piperidone-(4)-3-carboxylic acid ethyl ester hydrochloride, 10.1 gm. of S-benzyl-isothiourea hydrochloride and 10.4 gm. of potassium carbonate were each dissolved in 50 cc. portions of water, the three solutions were admixed with each other, and the mixture was heated at 80° C. for four hours. The reaction solution was then concentrated under an aspirator pump vacuum, and the residue was continuously extracted with chloroform for ten hours.

The chloroform extract solution was filtered through charcoal, and the filtrate was evaporated until an oily residue remained. The residue crystallized after a few days of standing, and was then recrystallized from absolute ethanol, yielding 6 gm. of the compound of the formula

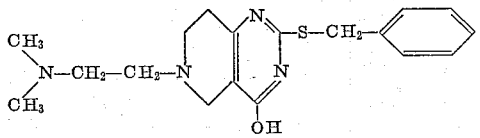

which had a melting point of 168–169° C.

EXAMPLE 13

*Preparation of 6-benzyl-2-anilino-4-hydroxy-5,6,7,8-tetrahydro-pyrido-[4,3-d]-pyrimidine*

A mixture of 57.5 gm. of 6-benzyl-2-methylmercapto-4-hydroxy-5,6,7,8 - tetrahydro-pyrido-[4,3-d]-pyrimidine and 110 gm. of aniline was heated at 150° C. on an oil bath for 15 hours while stirring. Thereafter, the unreacted excess aniline was removed by vacuum evaporation, the greasy residue was stirred with a small amount of ethanol, whereby it crystallized, and the crystalline mass was vacuum filtered. The filter cake was recrystallized for dimethylformamide, yielding 29 gm. of the compound of the formula

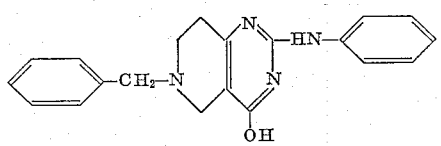

which had a melting point of 249–251° C.

EXAMPLE 14

*Preparation of 6-(β-diethylamino-ethyl)-2-piperidino-4-hydroxy-5,6,7,8-tetrahydro-pyrido-[4,3-d]-pyrimidine*

A mixture of 6 gm. of 6-(β-diethylamino-ethyl)-2-methylmercapto - 4 - hydroxy-5,6,7,8-tetrahydro-pyrido-[4,3-d]pyrimidine and 8.5 gm. of piperidine was refluxed for 36 hours. Thereafter, the unreacted excess piperidine was evaporated under an aspirator pump vacuum and the yellowish residue was stirred with a small amount of ether. The ethereal mixture was cooled, whereby a crystalline mass formed which was vacuum filtered. After recrystallization from acetone, 4 gm. of the compound of the formula

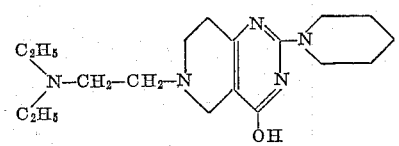

were obtained. The product had a melting point of 106–107° C.

EXAMPLE 15

*Preparation of 2,6-diphenyl-4-hydroxy-5,6,7,8-tetrahydro-pyrido-[4,3-d]-pyrimidine*

4.3 gm. of metallic sodium were dissolved in 150 cc. of absolute ethanol. 14.6 gm. of benzamidine hydrochloride were added to the solution, the sodium chloride which precipitated out was filtered off, and 23 gm. of N-phenyl-piperidone-(4)-3-carboxylic acid ethyl ester were added to the filtrate. The resulting mixture was refluxed for 15 hours. Thereafter, the ethanol solvent was evaporated under an aspirator pump vacuum, the residue was dissolved in water, 9 cc. of concentrated hydrochloric acid were added to the aqueous solution, and the precipitate formed thereby was separated by vacuum filtration. The filter cake was thoroughly washed with water and was then recrystallized from dimethylformamide, yielding 13 gm. of the compound of the formula

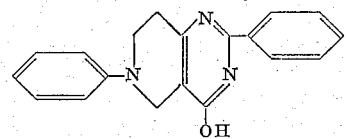

having a melting point of 302–304° C.

EXAMPLE 16

*Preparation of 6-(γ-methoxy-n-propyl)-2-phenyl-4-hydroxy-5,6,7,8-tetrahydro-pyrido-[4,3-d]-pyrimidine*

50 gm. of (γ-methoxy-n-propyl)-amino-dipropionic acid ethyl ester were added to a solution of 3.9 gm. of metallic sodium in 100 cc. of absolute methanol. The methanol was evaporated under an aspirator pump vacuum, and the residue was heated at 120° C. under a high vacuum. The reaction mixture was then taken up in 50 cc. of water, and a solution of 23.5 gm. of benzamidine hydrochloride in water was added thereto. The mixture was stirred for twenty hours at room temperature, whereby a precipitate separated out. The precipitate was separated by vacuum filtration and was recrystallized from ethanol. 6 gm. of the compound of the formula

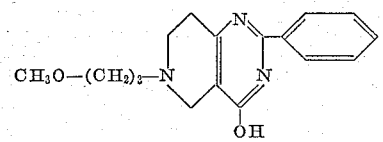

were obtained. The product had a melting point of 143° C.

EXAMPLE 17

Using a procedure analogous to that described in Example 9, 2-methylmercapto-4-hydroxy-6-phenyl-5,6,7,8-tetrahydro-pyrido-[4,3-d]-pyrimidine of the formula

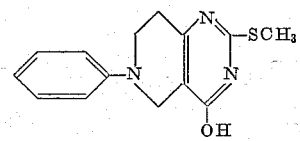

having a melting point of 234–235° C. was prepared from N-phenyl-piperidone-(4)-3-carboxylic acid ethyl ester and S-methyl-thiourea hydrobromide.

EXAMPLE 18

Using a procedure analogous to that described in Example 9, 2-methylmercapto-4-hydroxy-6-cyclohexyl-5,6,7,8-tetrahydro-pyrido-[4,3-d]-pyrimidine of the formula

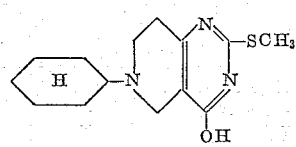

having a melting point of 253° C. was prepared from N-cyclohexyl-piperidone-(4)-3-carboxylic acid ethyl ester hydrochloride and S-methyl-thiourea sulfate.

EXAMPLE 19

Using a procedure analogous to that described in Example 9, 2-methylmercapto-4-hydroxy - 6 - (β - dimethylamino-ethyl)-5,6,7,8-tetrahydro-pyrido-[4,3-d]-pyrimidine of the formula

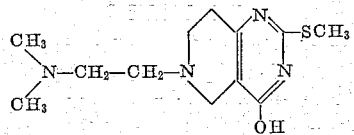

having a melting point of 180° C. was prepared from N-(β-dimethylamino-ethyl)-piperidone-(4)-3-carboxylic acid ethyl ester dihydrochloride and S-methyl-thiourea sulfate.

EXAMPLE 20

Using a procedure analogous to that described in Example 9, 2-methylmercapto-4-hydroxy - 6 - (γ - dimethylamino-n-propyl) - 5,6,7,8 - tetrahydro-pyrido-[4,3-d]-pyrimidine of the formula

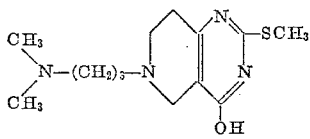

having a melting point of 139° C. was prepared from N-(γ-dimethylamino-n-propyl) - piperidone-(4)-3-carboxylic acid ethyl ester dihydrochloride and S-methyl-thiourea sulfate.

EXAMPLE 21

Using a procedure analogous to that described in Example 9, 2-methylmercapto-4-hydroxy - 6 - (β - diethylamino - ethyl) - 5,6,7,8-tetrahydro-pyrido-[4,3-d]-pyrimidine of the formula

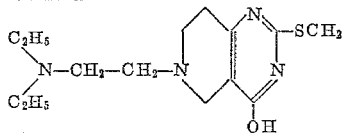

having a melting point of 178–179° C. was prepared from N-(β-diethylamino-ethyl)-piperidone-(4) - 3 - carboxylic acid ethyl ester dihydrochloride and S-methyl-thiourea sulfate.

EXAMPLE 22

Using a procedure analogous to that described in Example 9, 2-methylmercapto-4-hydroxy - 6 - (γ-diethylamino-n-propyl) - 5,6,7,8 - tetrahydro-pyrido-[4,3-d]-pyrimidine of the formula

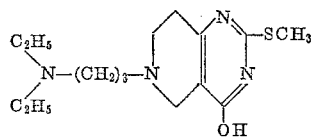

having a melting point of 126–127° C. was prepared from N-(γ-diethylamino-n-propyl)-piperidone-(4)-3-carboxylic acid ester dihydrochloride and S-methyl-thiourea sulfate.

EXAMPLE 23

Using a procedure analogous to that described in Example 12, 2-benzylmercapto - 4 - hydroxy-6-(β-diethylamino-ethyl) - 5,6,7,8 - tetrahydro-pyrido-[4,3-d]-pyrimidine of the formula

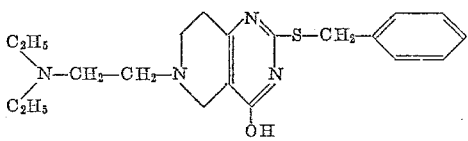

having a melting point of 135–136° C. was prepared from N-(β-diethylamino-ethyl) - piperidone - (4)-3-carboxylic acid ethyl ester dihydrochloride and S-benzyl-isothiourea hydrochloride.

EXAMPLE 24

Using a procedure analogous to that described in Example 12, 2-benzylmercapto - 4 - hydroxy-6-(γ-dimethylamino-n-propyl-5,6,7,8 - tetrahydro-pyrido-[4,3-d]-pyrimidine of the formula

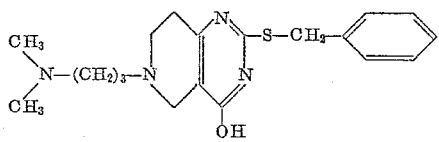

having a melting point of 151° C. was prepared from N-(γ-dimethylamino - n - propyl) - piperidone-(4)-3-carboxylic acid ethyl ester dihydrochloride and S-benzyl-isothiourea hydrochloride.

EXAMPLE 25

Using a procedure analogous to that described in Example 2, 2,6-dibenzyl - 4 - hydroxy-5,6,7,8-tetrahydropyrido-[4,3-d]-pyrimidine of the formula

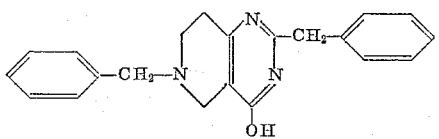

having a melting point of 227–228° C. was prepared from N-benzyl-piperidone-(4)-3-carboxylic acid ethyl ester hydrochloride and phenylacetamidine hydrochloride.

EXAMPLE 26

Using a procedure analogous to that described in Example 1, 2,8-dimethyl-4-hydroxy-6-benzyl-5,6,7,8-tetrahydropyrido-[4,3-d]-pyrimidine of the formula

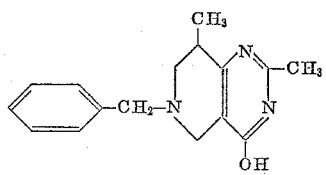

having a melting point of 177–178° C. was prepared from N-benzyl-5-methyl-piperidone-(4)-3-carboxylic acid ethyl ester hydrochloride and acetamidine hydrochloride.

EXAMPLE 27

Using a procedure analogous to that described in Example 1, 2-phenyl-4-hydroxy-6-benzyl-8-methyl-5,6,7,8-tetrahydro-pyrido-[4,3-d]-pyrimidine of the formula

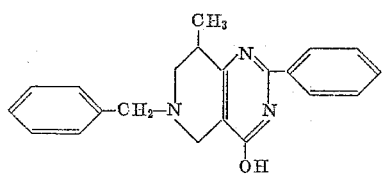

having a melting point of 194–195° C. was prepared from N-benzyl-5-methyl-piperidone-(4)-3-carboxylic acid ethyl ester hydrochloride and benzamidine hydrochloride.

EXAMPLE 28

Using a procedure analogous to that described in Example 2, 2-methyl-4-hydroxy-6-(β-dimethylamino-ethyl)-5,6,7,8-tetrahydro-pyrido-[4,3-d]-pyrimidine of the formula

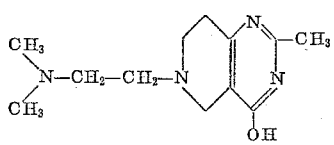

having a melting point of 107–108° C. was prepared from N-(β-dimethylamino-ethyl) - piperidone-(4)-3-carboxylic acid ethyl ester dihydrochloride and acetamidine hydrochloride.

EXAMPLE 29

Using a procedure analogous to that described in Example 2, 2-benzyl-4-hydroxy-6-(β-dimethylamino-ethyl)-5,6,7,8-tetrahydro-pyrido-[4,3-d]-pyramidine of the formula

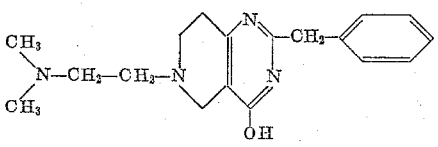

having a melting point of 171–172° C. was prepared from N-(β-dimethylamino-ethyl) - piperidone-(4)-3-carboxylic acid ethyl ester dihydrochloride and phenylacetamidine hydrochloride.

EXAMPLE 30

Using a procedure analogous to that described in Example 2, 2-phenyl-4-hydroxy-6-(γ-dimethylamino-n-propyl)-5,6,7,8-tetrahydro-pyrido-[4,3-d]-pyramidine of the formula having a melting point of 150–151° C. was prepared from N-(γ-dimethylamino-n-propyl)-piperidone-(4)-3-carboxylic acid ethyl ester dihydrochloride and benzamidine hydrochloride.

The bisoxalate salt of the pyrido-pyrimidine had a melting point of 223–225° C.

EXAMPLE 31

Using a procedure analogous to that described in Example 2, 2-phenyl - 4 - hydroxy - 6 - (β-diethylamino-ethyl)-5,6,7,8-tetrahydro-pyrido-[4,3-d]-pyramidine of the formula having a melting point of 141–142° C. was prepared from N-(β-diethylamino-ethyl)-piperidone - (4) - 3-carboxylic acid ethyl ester dihydrochloride and benzamidine hydrochloride.

EXAMPLE 32

Using a procedure analogous to that described in Example 2, 2 - benzyl - 4 - hydroxy - 6 - (β-diethylamino-ethyl)-5,6,7,8-tetrahydro-pyrido-[4,3-d]-pyrimidine of the formula having a melting point of 136–138° C. was prepared from N-(β-diethylamino-ethyl)-piperidone - (4) - 3 - carboxylic acid ethyl ester dihydrochloride and phenyl-acetamidine hydrochloride.

EXAMPLE 33

Using a procedure analogous to that described in Example 2,2-benzyl - 4 - hydroxy-6-(γ-diethylamino-n-propyl)-5,6,7,8-tetrahydro-pyrido-[4,3-d]-pyrimidine of the formula having a melting point of 106–108° C. was prepared from N-(γ-diethylamino-n-propyl)-piperidone-(4)-3-carboxylic acid ethyl ester dihydrochloride and phenyl acetamidine.

EXAMPLE 34

Using a procedure analogous to that described in Example 13, 2-piperidino-4-hydroxy-6-phenyl-5,6,7,8-tetrahydro-pyrido-[4,3-d]pyrimidine of the formula having a melting point of 261–262° C. was prepared from piperidine and 2-methylmercapto-4-hydroxy-6-phenyl-5,6,7,8-tetrahydro-pyrido-[4,3-d]-pyrimidine.

EXAMPLE 35

Using a procedure analogous to that described in Example 13, 2-morpholino-4-hydroxy-6-phenyl-5,6,7,8-tetrahydro-pyrido-[4,3-d]-pyrimidine of the formula having a melting point of 260–261° C. was prepared from morpholine and 2-methylmercapto-4-hydroxy-6-phenyl-5,6,7,8-tetrahydro-pyrido-[4,3-d]-pyrimidine.

EXAMPLE 36

Using a procedure analogous to that described in Example 13, 2-(N'-methyl-piperazino)-4-hydroxy-6-phenyl-5,6,7,8 - tetrahydro - pyrido - [4,3-d] - pyrimidine of the formula having a melting point of 268–269° C. was prepared from N-methyl-piperazine and 2-methylmercapto-4-hydroxy-6-phenyl-5,6,7,8-tetrahydro-pyrido-[4,3-d]-pyrimidine.

EXAMPLE 37

Using a procedure analogous to that described in Example 13, 2-(γ-methoxy-n-propyl-amino)-4-hydroxy-6-benzyl-5,6,7,8-tetrahydro-pyrido - [4,3-d] - pyrimidine of the formula having a melting point of 162–163° C. was prepared from (γ-methoxy-n-propyl)-amine and 2-methylmercapto-4-hydroxy - 6 - benzyl - 5,6,7,8 - tetrahydro-pyrido-[4,3-d]-pyrimidine.

EXAMPLE 38

Using a procedure analogous to that described in Example 13, 2-(di-n-butyl-amino)-4-hydroxy-6-benzyl-5,6,7,8-tetrahydro-pyrido-[4,3-d]-pyrimidine of the formula having a melting point of 104° C. was prepared from di-n-butylamine and 2-methylmercapto-4-hydroxy-6-benzyl-5,6,7,8-tetrahydro-pyrido-[4,3-d]-pyrimidine.

EXAMPLE 39

Using a procedure analogous to that described in Example 3, 2-n-butyl-4-hydroxy-6-(β-phenyl-ethyl)-5,6,7,8-tetrahydro-pyrido-[4,3-d]-pyrimidine of the formula

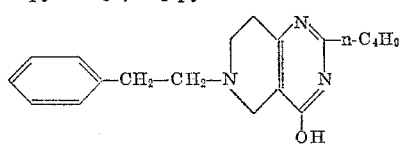

having a melting point of 161–162° C. was prepared from N-(β-phenyl-ethyl)-piperidone - (4) - 3 - carboxylic acid ethyl ester hydrochloride and α-amino-α-imino-pentane hydrochloride.

EXAMPLE 40

Using a procedure analogous to that described in Example 13, 2-pyrrolidino-4-hydroxy-6-benzyl-5,6,7,8-tetrahydro-pyrido-[4,3-d]-pyrimidine of the formula

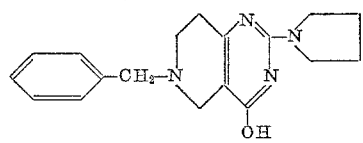

having a melting point of 233–235° C. was prepared from 2-methylmercapto-4-hydroxy-6-benzyl - 5,6,7,8-tetrahydro-pyrido-[4,3-d]-pyrimidine and pyrrolidine.

EXAMPLE 41

Using a procedure analogous to that described in Example 13, 2-piperidino-4-hydroxy-6-benzyl-5,6,7,8-tetrahydro-pyrido-[4,3-d]-pyrimidine of the formula

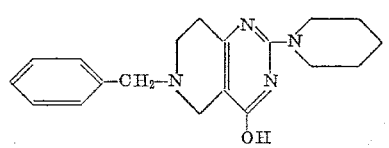

having a melting point of 220–222° C. was prepared from 2-methylmercapto-4-hydroxy-6-benzyl - 5,6,7,8-tetrahydro-pyrido-[4,3-d]-pyrimidine and piperidine.

EXAMPLE 42

Using a procedure analogous to that described in Example 13, 2-(N'-methyl-piperazino)-4-hydroxy-6-benzyl-5,6,7,8-tetrahydro - pyrido-[4,3-d]-pyrimidine of the formula

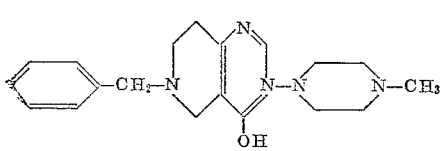

having a melting point of 218° C. was prepared from N-methyl-piperazine and 2-methylmercapto-4-hydroxy-6-benzyl-5,6,7,8-tetrahydro-pyrido-[4,3-d]-pyrimidine.

The tartrate of the free base had a melting point of 140° C. (decomposition).

EXAMPLE 43

Using a procedure analogous to that described in Example 13, 2-[N'-(β-hydroxy-ethyl)piperazino]-4-hydroxy-6-benzyl-5,6,7,8-tetrahydro - pyrido-[4,3-d]-pyrimidine of the formula

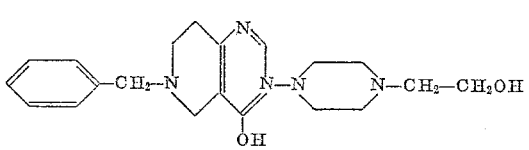

having a melting point of 227–28° C. was prepared from N-(β-hydroxy-ethyl)-piperazine and 2-methylmercapto-4-hydroxy - 6 - benzyl-5,6,7,8-tetrahydro-pyrido-[4,3-d]-pyrimidine.

EXAMPLE 44

Using a procedure analogous to that described in Example 13, 2-cyclohexylamino-4-hydroxy-6-benzyl-5,6,7,8-tetrahydro-pyrido-[4,3-d]-pyrimidine of the formula

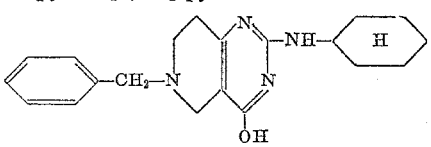

having a melting point of 95–96° C. was prepared from cyclohexylamine and 2 - methylmercapto-4-hydroxy-6-benzyl-5,6,7,8-tetrahydro-pyrido-[4,3-d]-pyrimidine.

EXAMPLE 45

Using a procedure analogous to that described in Example 13, 2-(benzyl-methyl-amino)-4-hydroxy-6-benzyl-5,6,7,8-tetrahydro-pyrido-[4,3-d]-pyrimidine of the formula

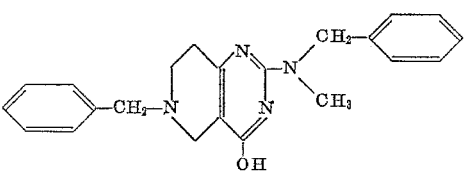

having a melting point of 181–182° C. from 2-methylmercapto-4-hydroxy-6-benzyl-5,6,7,8 - tetrahydro-pyrido-[4,3-d]-pyrimidine and benzylmethylamine.

EXAMPLE 46

Using a procedure analogous to that described in Example 13, 2-morpholino-4-hydroxy-6-(β-phenyl-ethyl)-5,6,7,8 - tetrahydro - pyrido - [4,3 - d] - pyrimidine of the formula

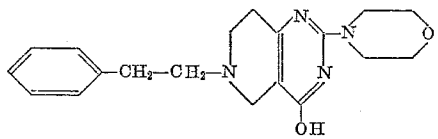

having a melting point of 226° C. was prepared from 2-methyl-mercapto - 4 - hydroxy-6-(β-phenyl-ethyl)-5,6,7,8-tetrahydro-pyrido-[4,3-d]-pyrimidine and morpholine.

EXAMPLE 47

Using a procedure analogous to that described in Example 13, 2 - (N' - methyl - piperazino)-4-hydroxy-6-(β-phenyl - ethyl) - 5,6,7,8-tetrahydro-pyrido-[4,3-d]-pyrimidine of the formula

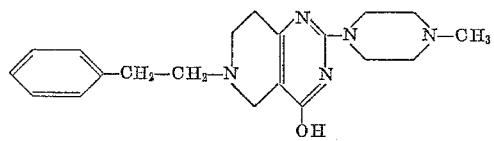

having a melting point of 177–178° C. was prepared from 2 - methylmercapto-4-hydroxy-6-(β-phenyl-ethyl)-5,6,7,8-tetrahydro-pyrido-[4,3-d]-pyrimidine and N-methyl-piperazine.

EXAMPLE 48

Using a procedure analogous to that described in Example 13, 2-morpholino-4-hydroxy-6-cyclohexyl-5,6,7,8-tetrahydro-pyrido-[4,3-d]-pyrimidine of the formula

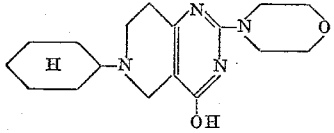

having a melting point of 231–233° C. was prepared from 2-methylmercapto - 4 - hydroxy-6-cyclohexyl-5,6,7,8-tetrahydro-pyrido-[4,3-d]-pyrimidine and morpholine.

EXAMPLE 49

Using a procedure analogous to that described in Example 13, 2-(N'-methyl-piperazino)-4-hydroxy-6-cyclohexyl-5,6,7,8-tetrahydro-pyrido-[4,3-d]-pyrimidine of the formula

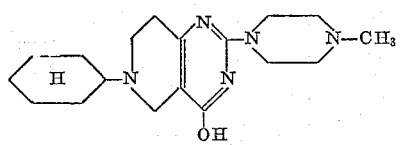

having a melting point of 213–215° C. was prepared from 2 - methylmercapto-4-hydroxy-6-cyclohexyl-5,6,7,8-tetrahydropyridyl-[4,3-d]-pyrimidine and N-methyl-piperazine.

EXAMPLE 50

Using a procedure analogous to that described in Example 13, 2-pyrrolidino-4-hydroxy-6-($\gamma$-dimethyl-amino-n-propyl)-5,6,7,8-tetrahydro-pyrido-[4,3-d]-pyrimidine of the formula

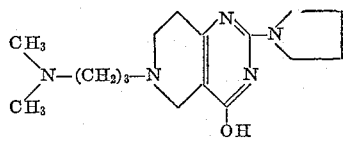

having a melting point of 143° C. was prepared from 2-methylmercapto - 4 - hydroxy-6-($\gamma$-dimethylamino-n-propyl) - 5,6,7,8 - tetrahydro-pyrido-[4,3-d]-pyrimidine and pyrrolidine.

EXAMPLE 51

Using a procedure analogous to that described in Example 13, 2-piperidino-4-hydroxy-6-($\gamma$-dimethylamino-n-propyl) - 5,6,7,8-tetrahydro-pyrido-[4,3-d]-pyrimidine of the formula

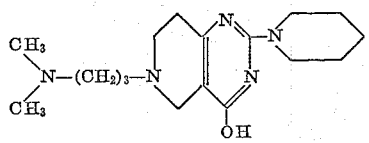

having a melting point of 142° C. was prepared from 2-methylmercapto - 4 - hydroxy-6-($\gamma$-dimethylamino-n-propyl) - 5,6,7,8 - tetrahydro-pyrido-[4,3-d]-pyrimidine and piperidine.

EXAMPLE 52

Using a procedure analogous to that described in Example 13, 2 - morpholino - 4 - hydroxy - 6 - ($\gamma$ - dimethylamino - n - propyl) - 5,6,7,8 - tetrahydro - pyrido - [4,3 - d] - pyramidine of the formula

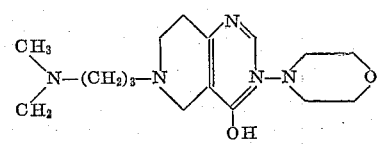

having a melting point of 168° C. was prepared from 2 - methyl - mercapto - 4 - hydroxy - 6 - ($\gamma$ - dimethyl - amino - n - propyl) - 5,6,7,8 - tetrahydro - pyrido - [4,3 - d] - primidine and morpholine.

EXAMPLE 53

Using a procedure analogous to that described in Example 13, 2 - pyrrolidino - 4 - hydroxy - 6 - ($\beta$ - diethylaminoethyl) - 5,6,7,8 - tetrahydro - pyrido - [4,3 - d] - pyrimidine of the formula

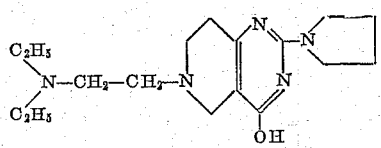

having a melting point of 134–135° C. was prepared from 2 - methylmercapto - 4 - hydroxy - 6 - ($\beta$ - diethylamino - ethyl) - 5,6,7,8 - tetrahydro - pyrido - [4,3 - d] - pyrimidine and pyrrolidine.

EXAMPLE 54

Using a procedure analogous to that described in Example 13, 2 - piperidino - 4 - hydroxy - 6 - ($\beta$ - diethylamino - ethyl) - 5,6,7,8 - tetrahydro - pyrido - [4,3 - d] - pyrimidine of the formula

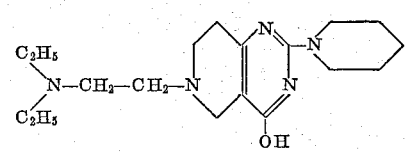

having a melting point of 106–107° C. was prepared from 2 - methylmercapto - 4 - hydroxy - 6 - ($\beta$ - diethylamino - ethyl) - 5,6,7,8 - tetrahydro - pyrido - [4,3 - d] - pyrimidine.

EXAMPLE 55

Using a procedure analogous to that described in Example 13, 2 - morpholino - 4 - hydroxy - 6 - ($\beta$ - diethylamino - ethyl) - 5,6,7,8 - tetrahydro - pyrido - [4,3 - d] - pyrimidine of the formula

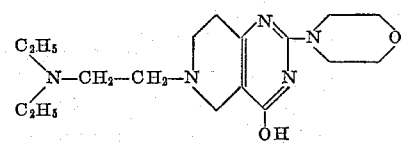

having a melting point of 144–145° C. was prepared from 2 - methylmercapto - 4 - hydroxy - 6 - ($\beta$ - diethylamino - ethyl) - 5,6,7,8 - tetrahydro - pyrido - [4,3 - d] - pyrimidine and morpholine.

EXAMPLE 56

Using a procedure analogous to that described in Example 13, 2 - (N' - methyl - piperazino) - 4 - hydroxy - 6 - ($\beta$ - diethylamino - ethyl) - 5,6,7,8 - tetrahydro-pyrido-[4,3-d]-pyrimidine of the formula

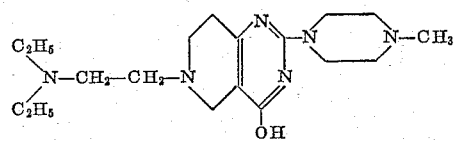

having a melting point of 142–143° C. was prepared from 2 - methylmercapto - 4 - hydroxy - 6 - ($\beta$ - diethylamino - ethyl) - 5,6,7,8 - tetrahydro - pyrido - [4,3 - d] - pyrimidine and N-methyl-piperazine.

EXAMPLE 57

Using a procedure analogous to that described in Example 13, 2 - piperidino - 4 - hydroxy - 6 - ($\gamma$ - diethylamino - n - propyl) - 5,6,7,8 - tetrahydro - pyrido - [4,3 - d] - pyrimidine of the formula

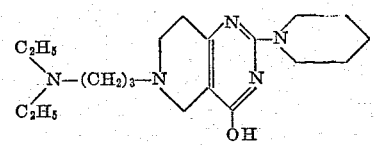

having a melting point of 89–90° C. was prepared from 2 - methylmercapto - 4 - hydroxy - 6 - ($\gamma$ - diethylamino - n - propyl) - 5,6,7,8 - tetrahydro - pyrido - [4,3 - d] - pyrimidine and piperidine.

EXAMPLE 58

Using a procedure analogous to that described in Example 13, 2-morpholino-4-hydroxy-6-($\gamma$-diethylamino-n-propyl)-5,6,7,8-tetrahydro-pyrido-[4,3-d]-pyrimidine of the formula

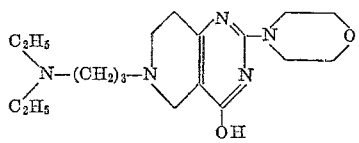

having a melting point of 103–104° C. was prepared from 2 - methylmercapto - 4-hydroxy-6-(γ-diethylamino-n-propyl) - 5,6,7,8 - tetrahydro - pyrido-[4,3-d]-pyrimidine and morpholine.

EXAMPLE 59

Using a procedure analogous to that described in Example 13, 2 - (di-n-butylamino)-4-hydroxy-6-benzyl-8-methyl - 5,6,7,8 - tetrahydro-pyrido-[4,3-d]-pyrimidine of the formula

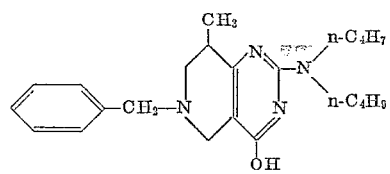

having a melting point of 128–129° C. was prepared from 2 - methylmercapto - 4-hydroxy-6-benzyl-8-methyl-5,6,7,8-tetrahydro-pyrido-[4,3-d]-pyrimidine and di-n-butylamine.

EXAMPLE 60

Using a procedure analogous to that described in Example 13, 2 - (γ-dimethylamino-n-propyl-amino)-4-hydroxy - 6-benzyl-5,6,7,8-tetrahydro-pyrido-[4,3-d]-pyrimidine of the formula

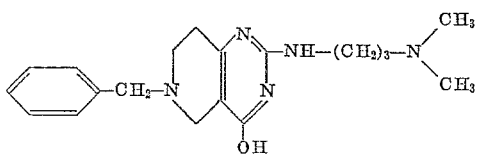

having a melting point of 173–175° C. was prepared from 2 - methylmercapto - 4 - hydroxy-6-benzyl-5,6,7,8-tetrahydro-pyrido-[4,3-d]-pyrimidine and N,N-dimethyl-propylenediamine.

EXAMPLE 61

Using a procedure analogous to that described in Example 15, 2-methyl-4-hydroxy-6-phenyl-5,6,7,8-tetrahydro-pyrido-[4,3-d]-pyrimidine of the formula

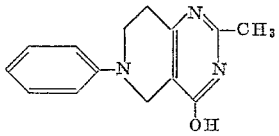

having a melting point of 247–249° C. was prepared from acetamidine hydrochloride and N-phenyl-piperidone-(4)-3-carboxylic acid ethyl ester.

EXAMPLE 62

Using a procedure analogous to that described in Example 15, 2-n-propyl-4-hydroxy-6-phenyl-5,6,7,8-tetrahydro-pyrido-[4,3-d]-pyrimidine of the formula

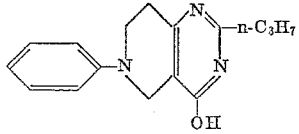

having a melting point of 183° C. was prepared from α-amino-α-imino-butane hydrochloride and N-phenyl-piperidone-(4)-3-carboxylic acid ethyl ester.

EXAMPLE 63

Using a procedure analogous to that described in Example 15, 2-dimethylamino-4-hydroxy-6-phenyl-5,6,7,8-tetrahydro-pyrido-[4,3-d]-pyrimidine of the formula

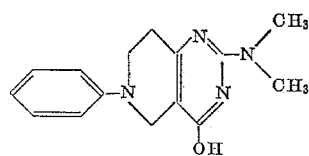

having a melting point of 257–258° C. was prepared from N,N-dimethyl-guanidine hydrochloride and N-phenyl-piperidone-(4)-3-carboxylic acid ethyl ester.

EXAMPLE 64

Using a procedure analogous to that described in Example 15, 2-methyl-4-hydroxy-6-benzyl-7-methyl-5,6,7,8-tetrahydro-pyrido-[4,3-d]-pyrimidine of the formula

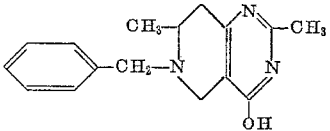

having a melting point of 169–170° C. was prepared from acetamidine hydrochloride and N-benzyl-6-methyl-piperidone-(4)-3-carboxylic acid ethyl ester.

EXAMPLE 65

Using a procedure analogous to that described in Example 15, 2-phenyl-4-hydroxy-6-benzyl-7-methyl-5,6,7,8-tetrahydro-pyrido-[4,3-d]-pyrimidine of the formula

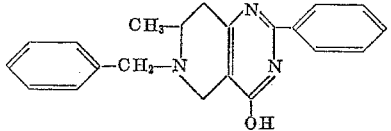

having a melting point of 208–210° C. was prepared from benzamidine hydrochloride and N-benzyl-6-methyl-piperidone-(4)-3-carboxylic acid ethyl ester.

EXAMPLE 66

Using a procedure analogous to that described in Example 15, 2-ethyl-4-hydroxy-6-benzyl-8-methyl-5,6,7,8-tetrahydro-pyrido-[4,3-d]-pyrimidine of the formula

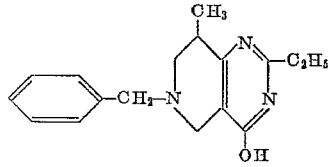

having a melting point of 163–164° C. was prepared from α-amino-α-imino-propane hydrochloride and N-benzyl-5-methyl-piperidone-(4)-3-carboxylic acid ethyl ester.

EXAMPLE 67

Using a procedure analogous to that described in Example 15, 4-hydroxy-6-(β-phenyl-ethyl)-5,6,7,8,-tetrahydropyrido-[4,3-d]-pyrimidine of the formula

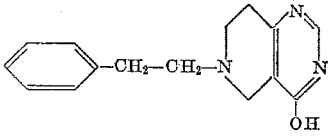

having a melting point of 173–175° C. was prepared from formamidine hydrochloride and N-(β-phenyl-ethyl)-piperidone-(4)-3-carboxylic acid ethyl ester.

EXAMPLE 68

Using a procedure analogous to that described in Example 15, 2-amino-4-hydroxy-6-(β-phenyl-ethyl)-5,6,7,8-tetrahydro-pyrido-[4,3-d]-pyrimidine of the formula

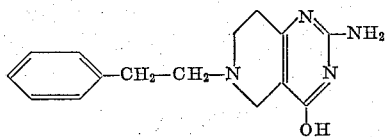

having a melting point of 280–282° C. was prepared from guanidine hydrochloride and N-(β-phenyl-ethyl)-piperidone-(4)-3-carboxylic acid ethyl ester.

EXAMPLE 69

Using a procedure analogous to that described in Example 15, 2-ethyl-4-hydroxy-6-(α-phenyl-ethyl)-5,6,7,8,-tetrahydro-pyrido-[4,3-d]-pyrimidine of the formula

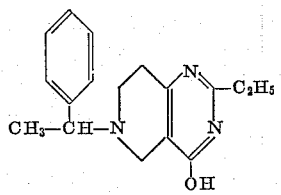

having a melting point of 158–160° C. was prepared from α-amino-α-imino-propane hydrochloride and N - (α-phenyl-ethyl)-piperidone-(4)-3-carboxylic acid ethyl ester.

EXAMPLE 70

Using a procedure analogous to that described in Example 15, 2-dimethylamino-4-hydroxy-6-(α-phenyl-ethyl)-5,6,7,8 - tetrahydro - pyrido - [4,3-d] - pyrimidine of the formula

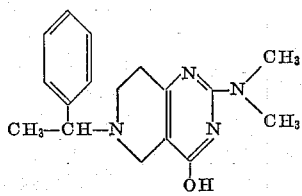

having a melting point of 172–174° C. was prepared from N,N-diemthyl-guanidine hydrochloride and N-(α-phenyl-ethyl)-piperidone-(4)-3-carboxylic acid ethyl ester.

EXAMPLE 71

Using a procedure analogous to that described in Example 13, 2 - n - hexylamino-4-hydroxy-6-benzyl-5,6,7,8-tetrahydro-pyrido-[4,3-d]-pyrimidine of the formula

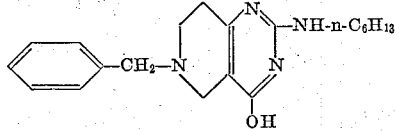

having a melting point of 152–153° C. was prepared from 2 - methylmercapto - 4 - hydroxy-6-benzyl-5,6,7,8-tetrahydro-pyrido-[4,3-d]pyrimidine and n-hexyl-amine.

EXAMPLE 72

Using a procedure analogous to that described in Example 15, 2-dimethylamino-4-hydroxy-6-benzyl-5,6,7,8-tetrahydro-pyrido-[4,3-d]-pyrimidine of the formula

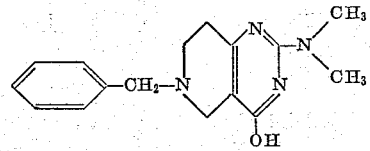

having a melting point of 218° C. was prepared from N,N-dimethyl-guanidine hydrochloride and N-benzyl-piperidone-(4)-3-carboxylic acid ethyl ester.

EXAMPLE 73

Using a procedure analogous to that described in Example 15, 2-dimethylamino-4-hydroxy-6-benzyl-7-methyl-5,6,7,8 - tetrahydro - pyrido - [4,3-d] - pyrimidine of the formula

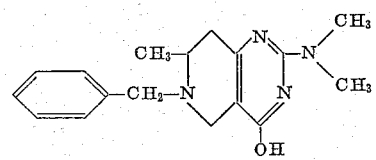

having a melting point of 233–235° C. was prepared from N,N-dimethyl-guanidine hydrochloride and N-benzyl-6-methyl-piperidone-(4)-3-carboxylic acid ethyl ester.

EXAMPLE 74

Using a procedure analogous to that described in Example 15, 2-dimethylamino-4-hydroxy-6-benzyl-8-methyl-5,6,7,8 - tetrahydro - pyrido - [4,3-d] - pyrimidine of the formula

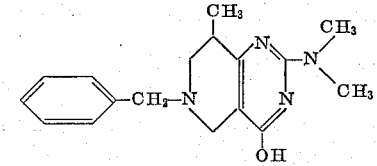

having a melting point of 157–159° C. was prepared from N,N-dimethyl-guanidine hydrochloride and N-benzyl-5-methyl-piperidone-(4)-3-carboxylic acid ethyl ester.

EXAMPLE 75

Using a procedure analogous to that described in Example 15, 2-dimethylamino-4-hydroxy-6-(β-phenyl-ethyl)-5,6,7,8 - tetrahydro - pyrido - [4,3-d] - pyrimidine of the formula

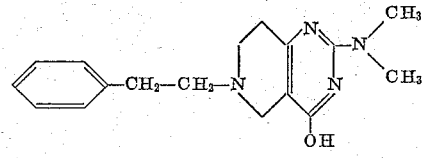

having a melting point of 200–201° C. was prepared from N,N-dimethyl-guanidine hydrochloride and N-(β-phenyl-ethyl)-piperidone-(4)-3-carboxylic acid ethyl ester.

EXAMPLE 76

Using a procedure analogous to that described in Example 15, 2-ethyl-4-hydroxy-6-benzyl-5,6,7,8-tetra-hydro-pyrido-[4,3-d]-pyrimidine of the formula

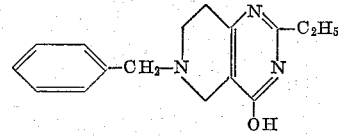

having a melting point of 172–174° C. was prepared from α-amino-α-imino-propane hydrochloride and N-benzyl-piperidone-(4)-3-carboxylic acid ethyl ester.

EXAMPLE 77

Using a procedure analogous to that described in Example 15, 2-n-propyl-4-hydroxy-6-benzyl-5,6,7,8-tetrahydro-pyrido-[4,3-d]-pyrimidine of the formula

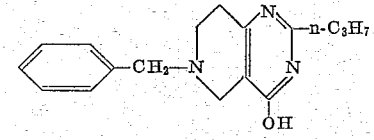

having a melting point of 147–148° C. was prepared from α-amino-α-imino-butane hydrochloride and N-benzyl-piperidone-(4)-3-carboxylic acid ethyl ester.

EXAMPLE 78

Using a procedure analogous to that described in Example 15, 2-isopropyl-4-hydroxy-6-benzyl-5,6,7,8-tetrahydro-pyrido-[4,3-d]-pyrimidine of the formula

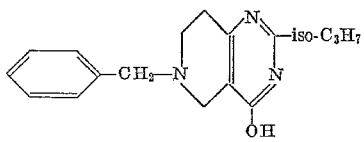

having a melting point of 187–188° C. was prepared from α-amino-α-imino-isobutane hydrochloride and N-benzyl-piperidone-(4)-3-carboxylic acid ethyl ester.

EXAMPLE 79

Using a procedure analogous to that described in Example 15, 2-n-butyl-4-hydroxy-6-benzyl-5,6,7,8-tetrahydro-pyrido-[4,3-d]-pyrimidine of the formula

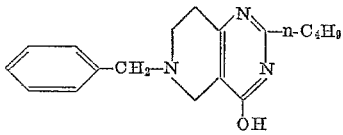

having a melting point of 147–148° C. was prepared from α-amino-α-imino-pentane hydrochloride and N-benzyl-piperidone-(4)-3-carboxylic acid ethyl ester.

EXAMPLE 80

Using a procedure analogous to that described in Example 15, 2-ethyl-4-hydroxy-6-benzyl-7-methyl-5,6,7,8-tetrahydro-pyrido-[4,3-d]-pyrimidine of the formula

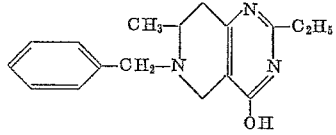

having a melting point of 169–170° C. was prepared from α-amino-α-imino-propane hydrochloride and N-benzyl-6-methyl-piperidone-(4)-3-carboxylic acid ethyl ester.

EXAMPLE 81

Using a procedure analogous to that described in Example 15, 2-n-propyl-4-hydroxy-6-benzyl-7-methyl-5,6,7,8-tetrahydro-pyrido-[4,3-d]-pyrimidine of the formula

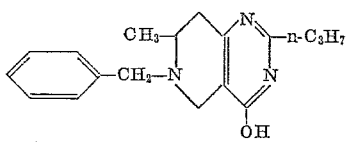

having a melting point of 148–150° C. was prepared from α-amino-α-imino-butane hydrochloride and N-benzyl-6-methyl-piperidone-(4)-3-carboxylic acid ethyl ester.

EXAMPLE 82

Using a procedure analogous to that described in Example 15, 2-n-butyl-4-hydroxy-6-benzyl-7-methyl-5,6,7,8-tetrahydro-pyrido-[4,3-d]-pyrimidine of the formula

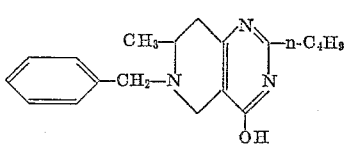

having a melting point of 123–124° C. was prepared from α-amino-α-imino-propane hydrochloride and N-benzyl-6-methyl-piperidone-(4)-3-carboxylic acid ethyl ester.

EXAMPLE 83

Using a procedure analogous to that described in Example 15, 2,6-dibenzyl-4-hydroxy-7-methyl-5,6,7,8-tetrahydro-pyrido-[4,3-d]pyrimidine of the formula

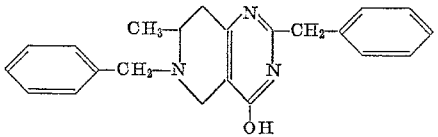

having a melting point of 174–176° C. was prepared from phenylacetamidine hydrochloride and N-benzyl-6-methyl-piperidone-(4)-3-carboxylic acid ethyl ester.

EXAMPLE 84

Using a procedure analogous to that described in Example 15, 2-n-propyl-4-hydroxy-6-benzyl-8-methyl-5,6,7,8-tetrahydro-pyrido-[4,3-d]-pyrimidine of the formula

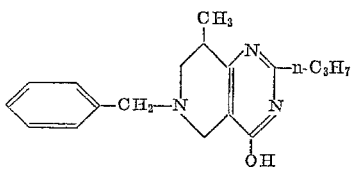

having a melting point of 144–145° C. was prepared from α-amino-α-imino-butane hydrochloride and N-benzyl-5-methyl-piperidone-(4)-3-carboxylic acid ethyl ester.

EXAMPLE 85

Using a procedure analogous to that described in Example 15, 2-n-butyl-4-hydroxy-6-benzyl-8-methyl-5,6,7,8-tetrahydro-pyrido-[4,3-d]-pyrimidine of the formula

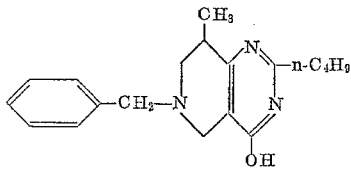

having a melting point of 120–121° C. was prepared from α-amino-α-imino-pentane hydrochloride and N-benzyl-5-methyl-piperidone-(4)-3-carboxylic acid ethyl ester.

EXAMPLE 86

Using a procedure analogous to that described in Example 15, 2,6-dibenzyl-4-hydroxy-8-methyl-5,6,7,8-tetrahydro-pyrido-[4,3-d]pyrimidine of the formula

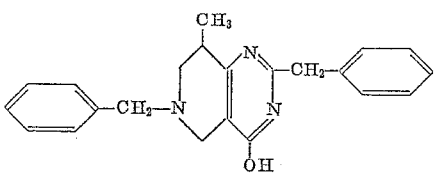

having a melting point of 162–163° C. was prepared from phenylacetamidine hydrochloride and N-benzyl-5-methyl-piperidone-(4)-3-carboxylic acid ethyl ester.

EXAMPLE 87

Using a procedure analogous to that described in Example 15, 2-methyl-4-hydroxy-6(β-phenyl-ethyl)-5,6,7,8-tetrahydro-pyrido-[4,3-d]-pyrimidine of the formula

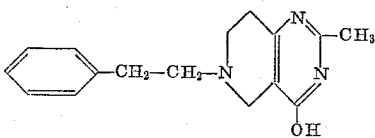

having a melting point of 210–212° C. was prepared from acetamidine hydrochloride and N-(β-phenyl-ethyl)-piperidone-(4)-3-carboxylic acid ethyl ester.

EXAMPLE 88

Using a procedure analogous to that described in Example 15, 2-ethyl-4-hydroxy-6-(β-phenyl-ethyl)-5,6,7,8-tetrahydro-pyrido-[4,3-d]-pyrimidine of the formula

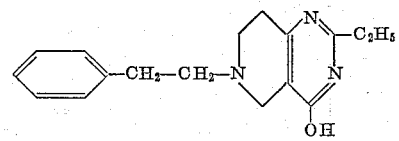

having a melting point of 196° C. was prepared from α-amino-α-imino-propane hydrochloride and N-(β-phenylethyl)-piperidone-(4)-3-carboxylic acid ethyl ester.

EXAMPLE 89

Using a procedure analogous to that described in Example 15, 2-n-propyl-4-hydroxy-6 - (β - phenyl - ethyl)-5,6,7,8-tetrahydro-pyrido-[4,3-d]-pyrimidine of the formula

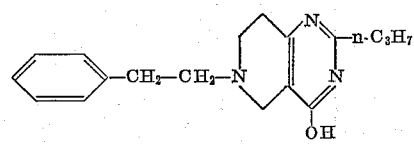

having a melting point of 165–167° C. was prepared from α-amino-α-imino-butane hydrochloride and N-(β-phenylethyl)-piperidone-(4)-3-carboxylic acid ethyl ester.

EXAMPLE 90

Using a procedure analogous to that described in Example 15, 2 - isopropyl - 4 - hydroxy - 6 - (β - phenylethyl)-5,6,7,8-tetrahydro-pyrido-[4,3-d]-pyrimidine of the formula

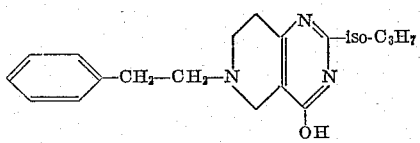

having a melting point of 173–175° C. was prepared from α-amino-α-imino-isobutane hydrochloride and N-(β-phenyl-ethyl)-piperidone-(4)-3-carboxylic acid ethyl ester.

EXAMPLE 91

Using a procedure analogous to that described in Example 15, 2 - phenyl - 4 - hydroxy - 6 - (β - phenyl-ethyl)-5,6,7,8-tetrahydro-pyrido-[4,3-d] - pyrimidine of the formula

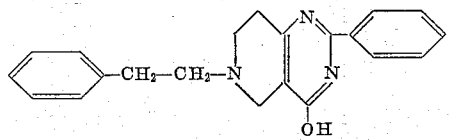

having a melting point of 216–218° C. was prepared from phenylformamidine hydrochloride and N-(β-phenyl-ethyl)-piperidone-(4)-3-carboxylic acid ethyl ester.

EXAMPLE 92

Using a procedure analogous to that described in Example 15, 2 - benzyl - 4 - hydroxy - 6 - (β - phenyl ethyl)-5,6,7,8-tetrahydro-pyrido-[4,3-d] - pyrimidine of the formula

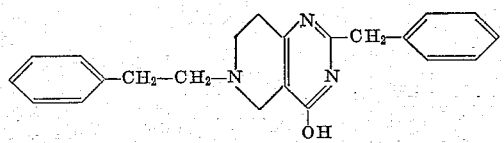

having a melting point of 191–193° C. was prepared from phenylacetamidine hydrochloride and N-(β-phenylethyl)-piperidone-(4)-3-carboxylic acid ethyl ester.

EXAMPLE 92a

*Preparation of 2,4-dihydroxy-6-γ-dimethylaminopropyl-5,6,7,8-tetrahydro-pyrido-[4,3-d]-pyrimidine*

3.9 gm. urea and 15.1 gm. γ-dimethylaminopropyl-piperidone(4)3-carboxylic acid ethyl ester were added to a solution of 1.53 gm. metallic sodium in 100 cc. of dry ethanol and the resulting solution refluxed for 20 hours. With cooling, the reaction mixture was neutralised with 65 cc. of a 1-normal hydrochloric acid and then evaporated to dryness. The residue was digested with cold water and the crystalline precipitate separated by vacuum filtration. The filter cake was washed repeatedly with cold water and then recrystallized from an ethanol/butanone mixture. 9.1 gm. of compound of the formula

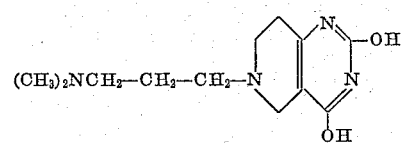

were obtained, the product had a melting point of 244–5° C.

EXAMPLE 93

Using a procedure analogous to that described in Example 13, 2-(di-n-butyl-amino)-4-hydroxy-6-(γ-dimethyl-amino-n-propyl)-5,6,7,8-tetrahydro-pyrido-[4,3 - d] - pyrimidine of the formula

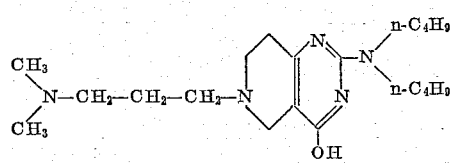

having a melting point of 170–171° C. was prepared from 2-methylmercapto-4-hydroxy-6-(γ-dimethylamino-n-propyl)-5,6,7,8-tetrahydro-pyrido-[4,3-d]-pyrimidine and di-n-butylamine.

The compounds according to the present invention, that is, the tetrahydro-pyrido-[4,3-d]-pyrimidine substitution products embraced by Formula I and their non-toxic acid addition salts, have useful pharmacodynamic properties. More particularly, they exhibit antiphlogistic, antipyretic, diuretic, bacteriostatic, sedative and coronary dilating activities.

Non-toxic, pharmacologically acceptable acid addition salts of the compounds defined by Formula I include, but are not restricted to, those formed with hydrochloric acid, hydrobromic acid, sulfuric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, 8-chlorotheophylline and the like.

For pharmacological purposes the compounds of the present invention are preferably incorporated as active ingredients into customary dosage unit compositions consisting essentially of an inert, physiologically compatible carrier having uniformly distributed therein one effective dosage unit of the active ingredient. One effective dosage unit of the compounds of the present invention is 20–300 mgm., preferably 50–200 mgm.

The following examples illustrate various dosage unit compositions containing a compound of the invention as the active ingredient. The parts are parts by weight unless otherwise specified.

EXAMPLE 94

Tablets

The tablet composition is compounded from the following ingredients:

| | Parts |
|---|---|
| 2 - n - propyl - 4 - hydroxy - 6 -($\beta$-phenyl-ethyl)- 5,6,7,8-tetrahydro-pyrido-[4,3-d]-pyrimidine | 100.0 |
| Lactose, powdered | 100.0 |
| Potato starch | 55.0 |
| Talcum | 15.0 |
| Gelatin | 7.0 |
| Magnesium stearate | 3.0 |
| Total | 280.0 |

Compounding procedure: The pyrido-pyrimidine compound is admixed with the lactose, the potato starch and the talcum, and the mixture is granulated by moistening it with an aqueous 10% solution of the gelatin and passing the moistened mixture through a 1.5 mm.-mesh screen. The granulate is then dried and is again passed through the screen. Thereafter, the magnesium stearate is blended in, and the mixture is pressed into tablets weighing 280 mgm. each. The individual tablets contain 100 mgm. of the active ingredient.

EXAMPLE 95

Coated pills

The tablets obtained in Example 94 are provided with a thin shell consisting essentially of sugar and talcum. The coated tablets are then polished with beeswax. Each coated pill weighs approximately 450 mgm.

EXAMPLE 96

Wafer capsules

The contents of the capsules are compounded from the following ingredients:

| | Parts |
|---|---|
| 2 - dimethylamino - 4 - hydroxy - 6 - ($\beta$ - phenyl-ethyl) - 5,6,7,8 - tetrahydro - pyrido - [4,3-d]-pyrimidine | 50.0 |
| Lactose | 200.0 |
| Talcum | 50.0 |
| Total | 300.0 |

Compounding procedure: The pyrido-pyrimidine compound is passed through a 0.3 mm.-mesh screen and is then thoroughly admixed with the remaining ingredients. The mixture is filled into wafer capsules holding 300 mgm. of the mixture. Each capsule contains 50 mgm. of the active ingredient.

EXAMPLE 97

Hypodermic solution

The solution is compounded from the following ingredients:

| | Parts |
|---|---|
| 2 - dimethylamino - 4 - hydroxy - 6 - ($\beta$ - phenyl-ethyl) - 5,6,7,8 - tetrahydro - pyrido - [4,3 - d]-pyrimidine | 50.0 |
| Tartaric acid | 30.0 |
| Double distilled water, q.s. ad 3000.0 parts by vol. | |

Compound procedure: First the tartaric acid and then, while heating to 70° C., the pyrido-pyrimidine compound are dissolved in about four-fifths of the required amount of distilled water. After cooling to room temperature, the resulting solution is diluted to the desired volume and filtered until free from suspended particles. The solution is then filled into white 3 cc. ampules, which are sterilized for 20 minutes at 120° C. and sealed. Each ampule contains 50 mgm. of the active ingredient.

Obviously, the above dosage unit composition examples are merely illustrative of the various compositions which may be used to administer the compounds of the present invention. Those skilled in the art will readily understand that the particular tetrahydro-pyrido-pyrimidines in the above dosage unit composition examples may be replaced by any of the other compounds embraced by Formula I or their non-toxic, pharmacologically acceptable acid addition salts. Similarly, the amount of active ingredient in the examples may be varied within the dosage unit limits set forth above, depending upon particular requirements.

While the present invention has been illustrated with the aid of certain specific embodiments thereof, it will be readily apparent to others skilled in the art that the invention is not limited to these specific embodiments and that other changes and modifications may be made without departing from the spirit of the invention or the scope of the appended claims.

I claim:

1. A compound selected from the group consisting of 4 - hydroxy-5,6,7,8-tetrahydro-pyrido-[4,3-d]-pyrimidine substitution products of the formula

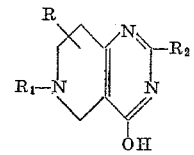

wherein

R is selected from the group consisting of hydrogen, 7-lower alkyl and 8-lower alkyl, $R_1$ is selected from the group consisting of (di-lower alkyl-amino)-lower alkyl, lower alkoxy-lower alkyl, phenyl, phenyl-lower alkyl and cyclohexyl, and $R_2$ is selected from the group consisting of hydroxyl, lower alkyl, amino, mono-lower alkyl-amino, di-lower alkyl-amino, cyclohexylamino, benzyl-lower alkyl-amino, [(di-lower alkyl-amino)-lower alkyl]-amino, (lower alkoxy-lower alkyl)-amino, pyrrolidino, piperidino, morpholino, N'-lower alkyl-piperazino, N'-hydroxy-lower alkyl)-piperazino, lower alkyl-mercapto and benzyl-mercapto, and their non-toxic, pharmacologically acceptable acid addition salts.

2. 2,7 - dimethy-4-hydroxy-6-benzyl-5,6,7,8-tetrahydro-pyrido-[4,3-d]-pyrimidine.

3. 2 - ethyl - 4 - hydroxy-6-benzyl-5,6,7,8-tetrahydro-pyrido-[4,3-d]-pyrimidine.

4. 2 - ethyl-4-hydroxy-6-benzyl-7-methyl-5,6,7,8-tetrahydro-pyrido-[4,3-d]-pyrimidine.

5. 2 - ethyl-4-hydroxy-6-($\alpha$-phenyl-ethyl)-5,6,7,8-tetrahydro-pyrido-[4,3-d]-pyrimidine.

6. 2,6 - dibenzyl-4-hydroxy-7-methyl-5,6,7,8-tetrahydro-pyrido-[4,3-d]-pyrimidine.

7. 2 - methyl - 4 - hydroxy-6-($\beta$-phenyl-ethyl)-5,6,7,8-tetrahydro-pyrido-[4,3-d]-pyrimidine.

8. 2 - n - propyl-4-hydroxy-6-($\beta$-phenyl-ethyl)-5,6,7,8-tetrahydro-pyrido-[4,3-d]-pyrimidine.

9. 2 - (di-n-butyl-amino)-4-hydroxy-6-benzyl-5,6,7,8-tetrahydro-pyrido-[4,3-d]-pyrimidine.

10. 2 - dimethylamino-4-hydroxy-6-($\alpha$-phenyl-ethyl)-5,6,7,8-tetrahydro-pyrido-[4,3-d]-pyrimidine.

11. 2 - dimethylamino - 4-hydroxy-6-($\beta$-phenyl-ethyl)-5,6,7,8-tetrahydro-pyrido-[4,3-d]-pyrimidine.

12. 2 - n - propyl-4-hydroxy-6-benzyl-7-methyl-5,6,7,8-tetrahydro-pyrido-[4,3-d]-pyrimidine.

13. 2 - isopropyl-4-hydroxy-6-($\beta$-phenyl-ethyl)-5,6,7,8,-tetrahydro-pyrido-[4,3-d]-pyrimidine.

14. 2 - n - butyl-4-hydroxy-6-(β-phenyl-ethyl)-5,6,7,8-tetrahydro-pyrido-[4,3-d]-pyrimidine.

References Cited by the Examiner
UNITED STATES PATENTS

| | | | |
|---|---|---|---|
| 2,686,781 | 8/54 | Hitchings et al. | 260—256.4 |
| 2,697,710 | 12/54 | Hitchings et al. | 260—256.4 |
| 2,890,152 | 6/59 | Babcock et al. | 167—65 |
| 2,994,640 | 8/61 | Zellner | 167—65 |

OTHER REFERENCES

Cook et al.: Jour. Chem. Soc. (London), 1945, pages 399–402.

Taylor et al.: J. Am. Chem. Soc. vol. 82, pages 6058–6064 (1960).

Van Arman et al.: Jour. Pharm. Exptl. Therap., vol. 111, 1954, pages 285–292.

NICHOLAS S. RIZZO, *Primary Examiner.*

JOHN D. RANDOLPH, *Examiner.*

UNITED STATES PATENT OFFICE
CERTIFICATE OF CORRECTION

Patent No. 3,186,991

June 1, 1965

Gerhard Ohnacker

It is hereby certified that error appears in the above numbered patent requiring correction and that the said Letters Patent should read as corrected below.

Column 1, line 12, for "5,6,7,7-8-" read -- 5,6,7,8- --; column 7, line 26, for "for" read -- from --; column 10, line 68, and column 11, lines 8 and 27, for "pyramidine", each occurrence, read -- pyrimidine --; column 14, line 28, before "from" insert -- was prepared --; column 15, lines 53 to 58, for the left-hand portion of the formula reading

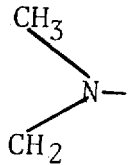   read   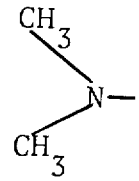

column 25, line 69, for "Compound" read -- Compounding --.

Signed and sealed this 23rd day of November 1965.

(SEAL)
Attest:

ERNEST W. SWIDER
Attesting Officer

EDWARD J. BRENNER
Commissioner of Patents